(12) United States Patent
Peelen

(10) Patent No.: US 6,649,551 B1
(45) Date of Patent: Nov. 18, 2003

(54) CONE GLASS FOR A DISPLAY TUBE

(75) Inventor: Jan Gerard Jacob Peelen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 114 days.

(21) Appl. No.: 09/890,507

(22) PCT Filed: Nov. 29, 2000

(86) PCT No.: PCT/EP00/11917

§ 371 (c)(1),
(2), (4) Date: Jul. 31, 2001

(87) PCT Pub. No.: WO01/40129

PCT Pub. Date: Jun. 7, 2001

(30) Foreign Application Priority Data

Dec. 1, 1999 (EP) ............................................. 99204056

(51) Int. Cl.[7] .............................................. C03C 3/105

(52) U.S. Cl. ........................................................ 501/62

(58) Field of Search ........................................... 501/62

(56) References Cited

U.S. PATENT DOCUMENTS 5,599,752 A * 2/1997 Piers et al. .................... 501/62
5,725,627 A    3/1998 Piers et al. .................... 65/75

FOREIGN PATENT DOCUMENTS

| DE | 246979  | * | 6/1987 |
| DE | 4438886 | * | 4/1996 |
| EP | 0657392 | * | 6/1995 |
| EP | 0970928 | * | 1/2000 |
| JP | 52068219| * | 6/1977 |

* cited by examiner

*Primary Examiner*—Karl Group
(74) *Attorney, Agent, or Firm*—Eric M. Bram

(57) ABSTRACT

The invention relates to a method of preparing a cone glass for a display tube. The cone glass according to the invention is obtained by mixing a first portion of glass fragments having a known composition with a second portion of vitrifying materials, wherein the first portion contains glass fragments of cone glass and screen glass of a display tube, and wherein the composition of the second portion is chosen to be such that at least one of the physical properties of X-ray absorption, electrical resistance, thermal coefficient of expansion and viscosity is in a desired range.

10 Claims, No Drawings

CONE GLASS FOR A DISPLAY TUBE

The invention relates to a cone for a display tube, which cone is made of cone glass according to the invention. The invention further relates to a method of preparing cone glass for a display tube by mixing a first portion of glass fragments having a known composition with a second portion of vitrifying materials.

Such a cone glass, method and the products obtained therefrom are known from U.S. Pat. No. 5,725,627 (PHN 14.670) in the name of the applicant. This known United States patent discloses a cone glass having a proportionally wide range of different components for the cone glass to be formed. Practice has proved that, with ever increasing stricter requirements being imposed on given properties of the cone glass, it is difficult or even impossible to use quantities of more than 5% by weight of recycled glass fragments of components of the used display tube as a starting material for new cone glass. It is currently common practice to use relatively small quantities of recycled glass for preparing new cone glass. The most important properties of the cone glass are thermal coefficient of expansion, viscosity, electrical resistance and X-ray absorption. Also when using variable quantities of recycled glass fragments, these properties should not vary too much because this may render the process of designing and further processing the cone glass impossible. Since it is very desirable for environmental reasons to use used display tubes as a starting material for new cone glass, further research has been done on compositions for cone glass on the possibility of using up to 40% by weight of recycled glass fragments, while searching for given small ranges of the composite components so that a range of compositions for cone glass is obtained within which the physical properties hardly vary.

After intensive research, a cone glass composition was found with which it is possible to use variable quantities (up to 40% by weight) of recycled glass fragments in the glass factory, where vitrifying components are added to the glass fragments so as to obtain a cone glass according to the invention in which the physical properties of the cone glass obtained are hardly changed.

The experiments which were performed yielded a cone glass having a composition as defined in claim 1, with which it is possible to obtain a cone glass having constant physical properties, independent of the quantity of glass fragments (up to 40% by weight).

It was surprisingly found that the range of compositions is large for given oxides such as SrO, BaO and PbO, namely larger than 2% by weight so that these oxides provide a wide tolerance in the use of recycled glass fragments, whereas the ranges are small, namely smaller than 1% by weight for other oxides such as $Al_2O_3$, $Na_2O$, $K_2O$, MgO and CaO, so that the presence of these oxides in the cone glass according to the invention should be adapted in a reasonably critical way by means of the other vitrifying materials which are added to the recycled glass fragments.

It is of great importance that the quantities by weight of the different oxides are adapted in a critical manner because the composition of display tube glass will strongly vary in the course of time and because the glass composition of the various display tubes is dependent on the supplier. It is therefore absolutely preferred to use display tubes made by the own manufacturer so that the glass composition is known. The government directives on recycling used glass, which will become even more stringent in the long term, necessitates many manufacturers to use a maximal number of discarded display tubes of television sets to prepare a cone glass from these tubes. This will ultimately also lead to a financial advantage for the display tube manufacturer.

The display tube actually comprises three parts, namely a screen, a cone and a neck. The neck constitutes only approximately 1% by weight of the total quantity of glass in the display tube. Proportionally, the cone glass contains little barium and strontium oxide but much lead oxide, while the glass from which the screen is made comprises barium oxide and strontium oxide but little or no lead oxide. The critical character of the most important-oxides in the composition of the cone glass according to the invention will hereinafter be elucidated with reference to the following comparative examples.

The most critical physical properties further stated in the examples are:

X-ray absorption (important for safety). A minimal value of 64.8 $cm^{-1}$ is required. A higher value is admitted, but a lower value is not.

Coefficient of expansion. This property is important for processing the cone glass to a final product, for the cone must fit on the screen. For this reason, the coefficient of expansion should be within narrow limits, namely $9.9 \pm 0.1 \times 10^{-6} K^{-1}$, at least in the temperature range between 25° C. and 300° C.

Viscosity. This property is important for melting and pressing. For the pressing process to be used, the working point is approximately 960° C. A shift of maximally 5° C. is admitted. The working point on the viscosity curve ($\log \eta = 4$) is stated as an example.

Electrical resistance. This property is important for avoiding flashover at the high voltages in the tube. The logarithmic value of the resistance (measured in $\Omega \cdot cm$ at 250° C.) of the glass should therefore be minimally 9.6.

A cone glass according to the invention can be obtained by means of a method of preparing cone glass for a display tube, by mixing a first portion of glass fragments having a known composition with a second portion of vitrifying materials, in which a quantity of one or more X-ray-absorbing oxides in the second portion is chosen to be such that the cone glass has a minimal X-ray absorption of 64.8 $cm^{-1}$. The first portion of glass fragments may already comprise a quantity of the X-ray-absorbing oxides such as SrO, BaO, PbO and $ZrO_2$. This quantity of X-ray-absorbing oxides must be replenished so that the cone glass has a minimal X-ray absorption of 64.8 $cm^{-1}$. Usually, only PbO is added in the second portion, but these may also be other X-ray-absorbing oxides.

Subsequently, the composition of the second portion is chosen to be such that at least one of the physical properties of electrical resistance, thermal coefficient of expansion and viscosity is in a desired range. Notably the quantity of $Al_2O_3$, $Na_2O$, $K_2O$, MgO and CaO in the second portion is varied for this purpose. In practice, usually only the quantities of $Na_2O$ and $K_2O$ are chosen to be such that the desired physical properties are obtained.

When the quantity of recycled fragments in the glass production is varied within very wide limits, from 0 to 40% by weight, then the contents of SrO, BaO, PbO and $ZrO_2$ will accordingly vary within a wide range.

It has been found that, provided that the contents of $Al_2O_3$, MgO and CaO are held within narrow limits (max.±0.3% by weight) (for which the basic glass materials of felspar and dolomite are responsible), the physical properties of the glass as mentioned above can be maintained constant by means of small corrections of the $Na_2O$ and $K_2O$ contents (hence with the basic materials Na carbonate and K carbonate).

The glass composition for a cone glass in which the percentage of recycled fragments may vary between 0 and 40% by weight and nevertheless has constant physical properties is as follows:

TABLE 1

| | |
|---|---|
| $Al_2O_3$ | 2.0 ± 0.3% by weight |
| $Na_2O$ | 6.0 – 6.5% by weight |
| $K_2O$ | 7.3 – 7.8% by weight |
| MgO | 2.3 ± 0.3% by weight |
| CaO | 3.3 ± 0.3% by weight |
| SrO | 0.2 – 2.2% by weight |
| BaO | 0.2 – 2.6% by weight |
| PbO | 20.5 – 23.0% by weight |
| $ZrO_2$ | 0.1 – 0.6% by weight. |

The rest, save for a refining agent (generally $Sb_2O_3$) and impurities, consists of $SiO_2$.

The invention will be further elucidated with reference to the following examples and comparative examples.

Examples 1–2 and Comparative Examples 3–4

In accordance with examples 1–2, a cone glass was prepared according to the invention in which 12% by weight of glass fragments were used in example 1 and 23% by weight of glass fragments were used in example 2. The glass fragments had the following composition (in percent by weight):

59.3% $SiO_2$-2.7% $Al_2O_3$-7.8% $Na_2O$-6.9% $K_2O$-0.7% MgO-1.3% CaO-5.6% SrO-6.8% BaO-6.6% PbO-0.3% $Sb_2O_3$-1.5% $ZrO_2$ and 0.5% rest.

To obtain a cone glass according to the invention, vitrifying materials as stated in Table 2 were added to these glass fragments.

TABLE 2

| | Example 1 | Example 2 |
|---|---|---|
| Quartz sand | 40.58 | 34.74 |
| Felspar | 9.27 | 7.64 |
| Na carbonate | 9.19 | 7.44 |
| K carbonate | 8.21 | 6.82 |
| Dolomite | 10.45 | 10 |
| Red lead | 21.97 | 20.92 |
| Na antimonate | 0.27 | 0.27 |
| K nitrate | 0.40 | 0.40 |
| Recycled glass | 12 | 23 |

Table 3 states the contents in % by weight of the materials used in the cone glass according to the invention (examples 1 and 2) and the contents of the different oxides in the comparative cone glass (examples 3 and 4).

Table 3 further states the physical properties, namely the X-ray absorption, the coefficient of expansion, the working point (log$\eta$=4) on the viscosity curve and the electrical resistance. In the comparative examples, notably in example 3, $Al_2O_3$, $K_2O$, MgO and CaO and, in example 4, the contents of $Al_2O_3$, $Na_2O$, MgO and CaO are beyond the range of the invention. In example 3, the temperature of the working point on the viscosity curve has become too high and, in example 3, the SrO and BaO quantities are both proportionally low and are insufficiently compensated by a relatively low content of PbO so that the X-ray absorption is undesirably low, namely lower than 64.8 cm$^{-1}$, which is not permitted. Moreover, the value of the electrical resistance is too low in example 3, namely lower than the required value of 9.6. In comparative example 4, the coefficient of expansion is too high and there is a too large shift of the working point.

TABLE 3

| | Example 1 | Example 2 | Example 3 | Example 4 |
|---|---|---|---|---|
| $SiO_2$ | 53.8 | 53.2 | 55.6 | 51.5 |
| $Al_2O_3$ | 2.0 | 2.0 | 2.5 | 1.5 |
| $Na_2O$ | 6.4 | 6.2 | 6.4 | 6.8 |
| $K_2O$ | 7,7 | 7,4 | 7,0 | 7,5 |
| MgO | 2.4 | 2.4 | 1.8 | 2.8 |
| CaO | 3.3 | 3.4 | 2.6 | 4.0 |
| SrO | 0.7 | 1.4 | 0.7 | 1.4 |
| BaO | 0.8 | 1.5 | 0.8 | 1.5 |
| PbO | 22.3 | 21.8 | 22.0 | 22.0 |
| $Sb_2O_3$ | 0.2 | 0.2 | 0.2 | 0.2 |
| $ZrO_2$ | 0.2 | 0,2 | 0,2 | 0,4 |
| Rest | 0.2 | 0.3 | 0.2 | 0.4 |
| X-ray absorption (cm$^{-1}$) | 65.2 | 66,0 | 64.1 | 67.1 |
| Coefficient of expansion (*10$^{-1}$/° K.) | 9,9 | 9,9 | 9,7 | 10,2 |
| Working point (log $\eta$ = 4) | 960° C. | 957° C. | 979° C. | 931° C. |
| Log resistance at 250° C. | 9.7 | 9.7 | 9.5 | 9.7 |

The comparison of examples 1 and 2 according to the invention with the comparative examples 3 and 4 show the critical character of the limits of the composite oxides in the cone glass according to the invention.

Generally, the invention relates to a method of preparing cone glass for a display tube. The cone glass according to the invention is obtained by mixing a first portion of glass fragments having a known composition with a second portion of vitrifying materials, in which the first portion comprises fragments of cone glass and screen glass of a display tube, and the composition of the second portion is chosen to be such that at least one of the physical properties of X-ray absorption, electrical resistance, thermal coefficient of expansion and viscosity is in a desired range.

What is claimed is:

1. A cone glass for a display tube, which cone glass contains the following components:

1.7–2.3% by weight of $Al_2O_3$, 6.0–6.5% by weight of $Na_2O$, 7.3–7.8% by weight of $K_2O$, 2.0–2.6% by weight of MgO, 2.9–3.7% by weight of CaO, 0.2–2.2% by weight of SrO, 0.2–2.6% by-weight of BaO, 20.5–23%-by weight of PbO, 0.1–0.3% by weight of $Sb_2O_3$, 0.1–6.6% by weight of $ZrO_2$, up to 0.3% by weight of impurities, 48–59% by weight of $SiO_2$.

2. The cone glass of claim 1, wherein the composition of the components in the cone glass is chosen to be such that the X-ray absorption is minimally 64.8 cm$^{-1}$.

3. The cone glass of claim 1, wherein the thermal coefficient of expansion of the cone glass is between 9.8*10$^{-6}$ K$^{-1}$ and 10.0*10$^{-6}$K$^{-1}$.

4. The cone glass of claim 1, wherein the logarithm of the electrical resistance of the glass, measured at a temperature of 250° C., is minimally 9.6 $\Omega$cm.

5. The cone glass of claim 1, wherein the cone glass has a viscosity of 10$^4$ Pa·s at a temperature between 955° C. and 965° C.

6. A cone for a display tube obtained from the cone glass of claim 1.

7. A cone for a display tube obtained from cone glass as recited in claim 2.

8. A cone for a display tube obtained from cone glass as recited in claim 3.

9. A cone for a display tube obtained from cone glass as recited in claim 4.

10. A cone for a display tube obtained from cone glass as recited in claim 5.

* * * * *